(12) United States Patent
Cuni et al.

(10) Patent No.: US 10,020,994 B2
(45) Date of Patent: Jul. 10, 2018

(54) AUTOMATICALLY DETERMINING LOCATIONS OF NETWORK MONITORS IN A COMMUNICATION NETWORK

(71) Applicant: Virtual Instruments Corporation, San Jose, CA (US)

(72) Inventors: Genti Cuni, Mountain View, CA (US); Leo Szumel, South Lake Tahoe, CA (US); Adam H. Schondelmayer, Campbell, CA (US)

(73) Assignee: Virtual Instruments Corporation, San Jose, CA (US)

( * ) Notice: Subject to any disclaimer, the term of this patent is extended or adjusted under 35 U.S.C. 154(b) by 76 days.

(21) Appl. No.: 14/253,141

(22) Filed: Apr. 15, 2014

(65) Prior Publication Data

US 2015/0295771 A1    Oct. 15, 2015

(51) Int. Cl.
*G06F 15/173* (2006.01)
*H04L 12/24* (2006.01)
*H04L 12/26* (2006.01)

(52) U.S. Cl.
CPC .............. *H04L 41/12* (2013.01); *H04L 43/12* (2013.01)

(58) Field of Classification Search
CPC ........................... H04L 41/12; H04L 43/0876
See application file for complete search history.

(56) References Cited

U.S. PATENT DOCUMENTS

| | | | | |
|---|---|---|---|---|
| 5,437,046 A * | 7/1995 | Bright | ................... | H04L 12/462 370/254 |
| 5,715,396 A * | 2/1998 | Chatwani | ................ | H04L 29/06 709/242 |
| 6,205,122 B1 * | 3/2001 | Sharon | .................... | H04L 41/12 370/254 |
| 2014/0149569 A1* | 5/2014 | Wittenstein | ............. | H04L 43/12 709/224 |

* cited by examiner

*Primary Examiner* — Suraj Joshi
*Assistant Examiner* — Jaren M Means
(74) *Attorney, Agent, or Firm* — Lowenstein Sandler LLP

(57) ABSTRACT

Automatically identifying a location of a network monitor within a network topology is described. A location of a network monitor within a network topology (which can, and often does, change structure, constituent devices, or both) is determined by monitoring transmissions passing through the network link to which the network monitor is connected. The network monitor uses locally unique device identifiers present in a network transmission to identify the devices or ports most commonly communicating with each other.

15 Claims, 5 Drawing Sheets

AUTOMATICALLY DETERMINING LOCATIONS OF NETWORK MONITORS IN A COMMUNICATION NETWORK

BACKGROUND

The present disclosure relates generally to analysis of communication networks. Specifically, the present disclosure relates to automatically determining locations of network monitors in a communication network.

Data networks continue to evolve with ever-higher speeds and more extensive topologies. In order to improve performance of such networks and troubleshoot problems, the performance of a network is monitored through various techniques. Conventional monitoring systems often use traffic analysis points (also known as test access points or "TAPs") to divert a portion of a data signal's power and send it to a network monitoring device while allowing the majority of the signal's power to continue to its destination.

When a portion of the data signal is sent to the network monitor, it decodes the signal to identify locally unique endpoint identifiers (e.g., a fiber channel identifier ("FCID") in a fiber channel network) of the signal source and the signal destination. The locally unique endpoint identifier is the functional equivalent of an IP address in an Ethernet network and, like an IP address, is a locally unique identifier for the corresponding communication device. Even when the identities of the communicating devices are known, the location of the network monitor within the network topology is unknown. This is because the network monitor is generally a passive device and because the identities of the communicating devices do not themselves describe the network topology. Because the location of the network monitor within the topology is unknown, the network performance analysis that uses network monitor data is of limited applicability.

Therefore, a method for automatically identifying a location of a network monitor in a communication network would improve the effectiveness of network analysis.

The figures depict various embodiments of the present disclosure for purposes of illustration only. One skilled in the art will readily recognize from the following discussion that alternative embodiments of the structures and methods illustrated herein may be employed without departing from the principles described herein.

DETAILED DESCRIPTION

Overview

Methods and systems are described for automatically identifying a location of a network monitor within a network. Embodiments of the present disclosure are set in the context of a storage area fiber channel network, but the embodiments herein are applicable to any network type.

At a high level, a location of a network monitor within a network (which can, and often does, change structure, constituent devices, or both) is determined by monitoring transmissions passing through a network communication link to which the network monitor is connected via a test access point ("TAP"). While the network monitor can identify which devices and/or ports are communicating with each other (using e.g., worldwide name ("WWN"), fiber channel identifier ("FCID") or other identifiers, the device identities alone are insufficient for the network monitor to identify its location within a network. To identify its location (or a candidate set of locations) within a network, a network monitor uses the device identities of devices communicating with one another through the link that the network monitor is connected to, and by reference to a network topology (or "network graph") infers its location within the network based on which such conversations could be observed together as a set. This then identifies the link to which the network monitor is attached, and thus the location of the network monitor.

Network Topology

Figure 1:
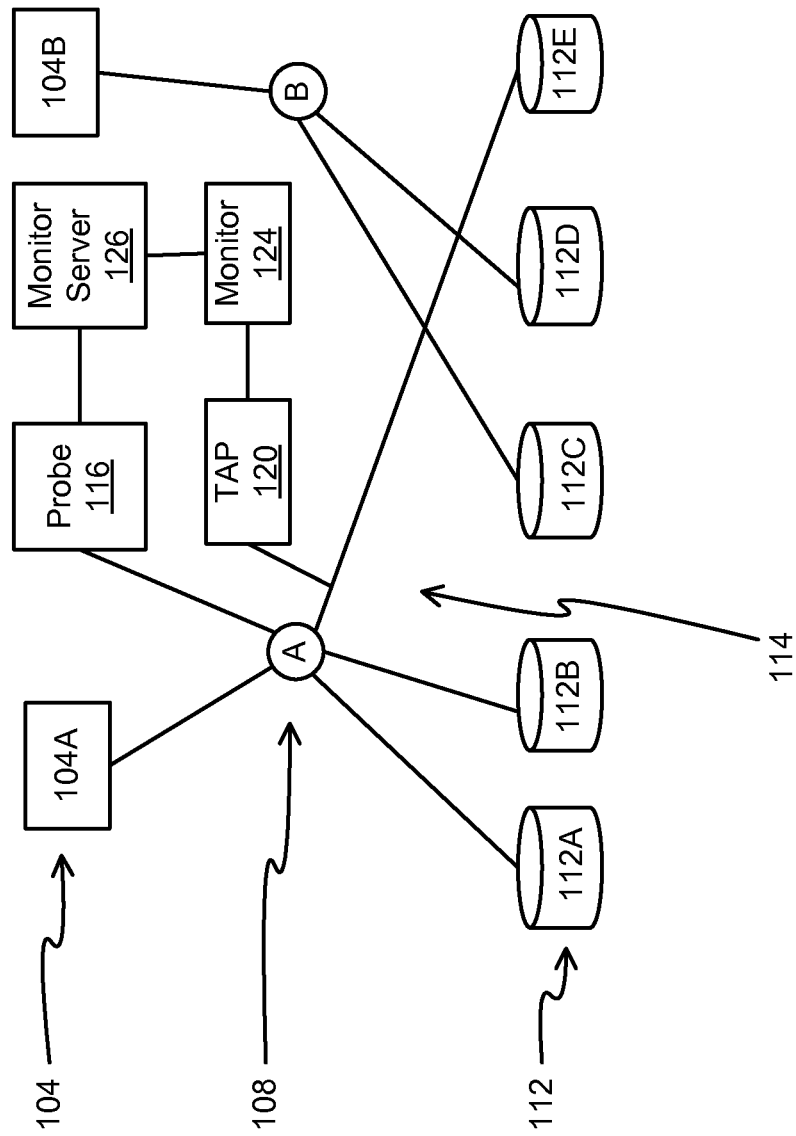
FIG. 1 is a schematic illustration of a network, the network including multiple servers, switches, storage devices and a network monitor, in an embodiment.

FIG. 1 is a schematic illustration of an example network 100 (in this case, a storage area network or "SAN") in which embodiments of the present disclosure are applied. In this example, the network 100 includes servers 104A-C (collectively 104), multiple switches 108A-B (collectively 108), and a group of storage devices 112A-E (collectively 112). The network 100 also includes a probe 116, a TAP 120, a monitor 124, and a monitor server 126. These elements (and others not shown for clarity, but commonly used in networks) are connected by a plurality of network links 114. While a SAN is depicted in FIG. 1, it will be appreciated that the embodiments described herein are applicable to any type of network. While only one TAP/Monitor pair 120, 124 is illustrated in FIG. 1 for purposes of instruction, it should be recognized that in a typical network, there may be a large number of such pairs deployed throughout the network.

Servers 104 are used to execute, for example, computations, database queries, general instructions, or read and write instructions to and from the various storage devices 112. Examples of servers used in typical embodiments using system 100 include, but are not limited to HP-UX server systems from Hewlett-Packard Company, and other servers fabricated by IBM, Oracle, and others.

The servers 104 communicate with the storage devices 112 by the transmission of data through various elements of the network, including one or more switches 108 and one or more network links 114. In the example of a packet that includes data (or "payload") to be written to one of the storage devices 112, the packet also includes address information identifying the source and destination of the packet. This address information is often included in a "header" portion of a packet that includes other meta-data as well as the address information. The source and destination addresses can specify a device and/or one or more ports associated with the device.

In the example of the network 100, and in other similar networks, the address information is used to identify a destination and a source of the data to be written to one of the storage devices 112. As mentioned above, device identifiers are insufficient for determining a location of a network monitor within a network topology, including fiber channel networks such as the example SAN 100 shown in FIG. 1. As described herein, the location within the network of a network monitor can be inferred by identifying which devices are conversing over the link to which the network monitor is attached. Based on this information, and an understanding of which devices are not communicating over the link, the location (or a set of candidate locations) of the network monitor is identified.

Switches 108 of the network 100 connect one or more servers 104 with one or more storage devices 112 and permit flexibility and versatility in the network. Switches allow, for example, the balancing of processing loads, optimization of storage utilization, and the management of other aspects of network performance. Switches 108 also enable multiple devices to be in communication with each other without requiring a direct link between them. Examples of switches 108 used in the SAN network 100 include any of a variety of SAN switches.

In the example shown of the SAN network 100, storage devices 112 include volatile and non-volatile memory systems used to store data transmitted through the network. Examples of storage devices 112 include RAID storage devices and others.

The network links 114 of the example network 100 include optical fibers for the transmission of data and instructions between the servers 104 and the storage devices 112. In the example of the network 100, the network links 114 are cables of optical fibers. In other types of networks, the links 114 are Ethernet cables, electrically conductive connections, or other types of connections that place devices in communication with one another. As shown, the network links 114 can be used to connect devices to switches 108, which facilitate creation of more flexible, and more complicated, network topologies.

The probe 116, the TAP 120, and the network monitor 124 are used to monitor transmissions between the servers 104 and the storage devices 112, evaluate the transmissions for performance deficiencies, determine a topology of a network (using, for example, identities of devices and ports connected to switches 108), and facilitate identification of a location of the network monitor 124 within a topology of the network 100.

The probe 116, connected in this example to an Ethernet port of switch 108A, collects management data received by the switch 108A. This data includes, for example, the devices or ports of the switch 108A connected to the network, and the identifiers (whether locally or globally unique) of the ports and their associated devices. The information collected by the probe 116 is used to identify topology information that can be used to determine a location of the network monitor 124 within the network.

In this example, the probe 116 is a computer program for querying the devices of the network 100, collecting management data associated with transmissions in and out of one or more of switches 108 to identify the FCID of the communicating devices, and polling the switch 108 for the devices (and/or their associated ports) connected to the switch 108. While FIG. 1 shows the probe 116 as separate (and thus executed by a device using software stored in a non-transitory storage medium) from the switch 108A, in other embodiments the probe 116 is installed in a non-transitory storage medium of the switch 108A or the network monitor 124.

The TAP 120 is a device placed in communication with one of the links 114 that obtains a copy of communications occurring on a network link. In the case of SAN 100, which uses optical links, the TAP 120 diverts a portion of the power of a data signal and sends it to a network monitor 124 while allowing the majority of the signal power to continue to its destination. One example of such a device is a fused biconical tapered ("FBT") optical signal splitter that is inserted in a link 114. Other types of networks (such as non-optical networks) use appropriate technologies for accessing or copying the transmitted signals.

The network monitor 124, in its conventional operation, receives signals from the TAP 120 and decodes the signals to determine performance metrics related to the transmission of the signals, the communicating devices, and the network. The network monitor 124 also performs various analyses to determine performance using, for example, header data of the transmitted packet. In one example, the network monitor 124 extracts from one or more packets the time for a storage device 112 to execute an instruction, such as a read instruction or a write instruction, provided by one of the servers 104. The network monitor 124 can also determine statistics related to a population of performance measurements including mean read time, read time variability, and others. However, as described above, usability of the performance metrics in actually tuning the network 100 or improving its performance is complicated by the fact that location of the network monitor 124 within the network topology is either not known or not conveniently known. In particular, because the topology of the network can change, associating performance metrics with specific devices in the (changeable) network is either not convenient or not possible.

To address this, as described in more detail below, the network monitor 124 infers its location based on which devices it observes communicating with each other. This information is then correlated with the network graph to infer the link to which the network monitor 124 is connected, thus allowing application of the performance metrics. In other examples of systems using more than one network fabric, embodiments of the present disclosure are used to identify the network fabric to which the network monitor is attached (which can then optionally be used in connection with other information, such as unique device identifiers, to analyze the performance of the identified fabric). The link within the fabric to which the network monitor is attached may optionally be identified also. Regardless of whether a fabric or a link within a fabric (or both) are identified, benefits of embodiments described herein include assisting a user with identifying and resolving technical problems within a fabric and provide the user with an ability to identify, aggregate, and analyze performance measurements of a fabric, devices within a fabric, a link, or combinations thereof.

In one embodiment, the monitor server 126 is used to collect and correlate information from the probe 116 and the monitor 124. In one example, the monitor server 126 generates the network graph (that is, the logical and physical relationships between the various devices and switches of the network 100) as each probe 116 provides to the monitor server the identities of the devices/ports connected the switch 108. The monitor server 126 also receives information from the network monitor 124 (such as the identities of the devices/ports in communication with each other), which is used to infer the location of the network monitor within the network 100. While, in this example, these functions are described as being performed by the monitor server 126, a separate server is not required. As shown below in the context of FIG. 2, these functions are performed by various modules within a network monitor that is in communication with a probe 116 (via, e.g., an Ethernet connection).

In actual implementation, network 100 consists of many additional components, typically with tens if not thousands of source devices, destination devices and TAPS, interconnected via multimodal optical fibers capable of carrying numerous independent signals at various wavelengths in a frequency-division multiplexed manner. The components shown in FIG. 1 are thus illustrated in a simplified manner to most clearly illustrate the subject of this disclosure.

Example Embodiment

Figure 2:
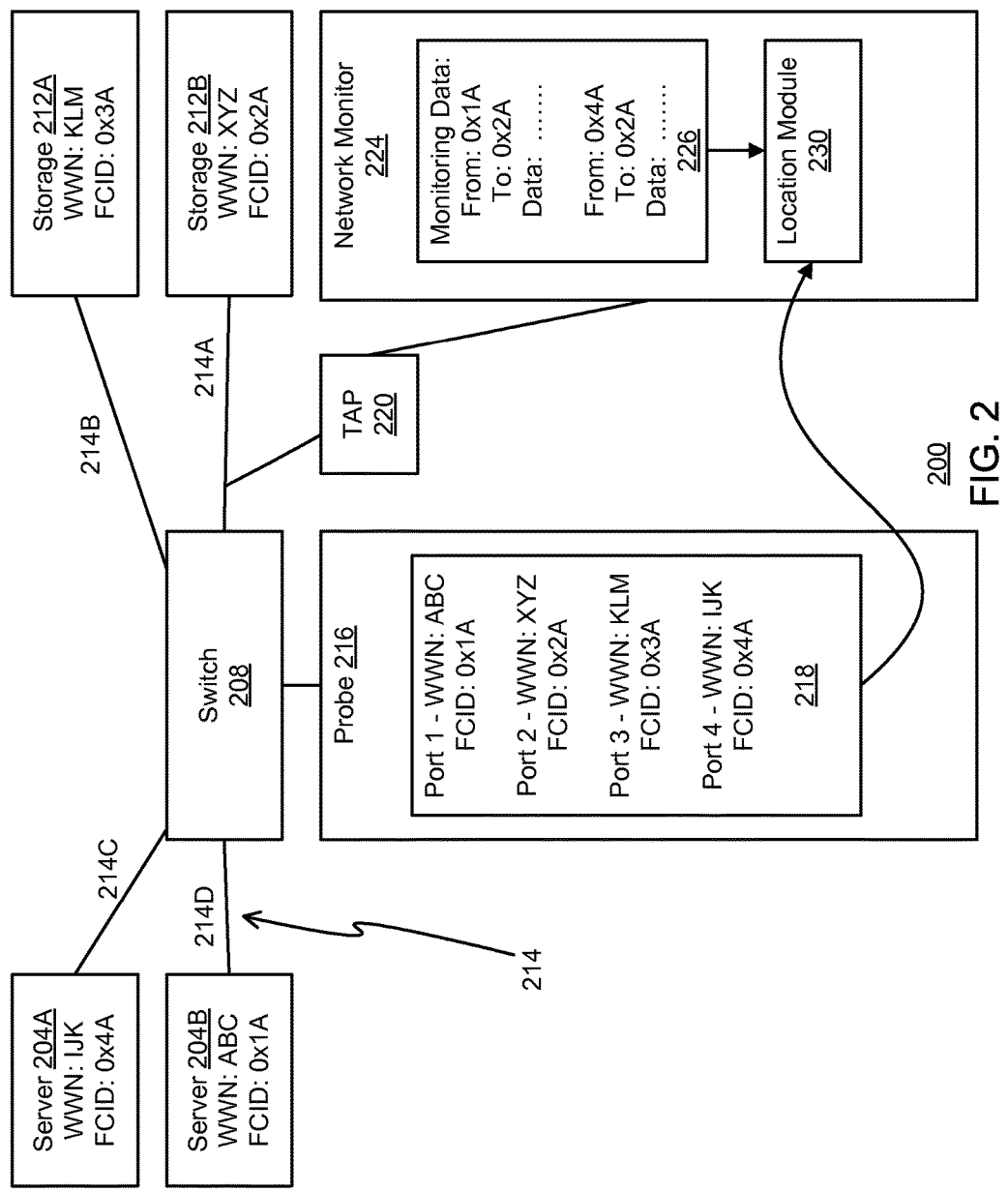
FIG. 2 is a simplified illustration of a network, in which a location of a network monitor within the network is determined, in an embodiment.

FIG. 2 illustrates a specific example of a network 200 that incorporates embodiments of the present disclosure to determine a location of a network monitor 224 within the network. This is accomplished by determining which devices are communicating with each other through the link to which the network monitor 224 is attached, and inferring the location of the network monitor 224.

Analogous to the network 100 described in FIG. 1, the network 200 includes servers 204A and 204B, a fiber channel switch 208, storage devices 212A and 212B, a plurality of links 214, a probe 216, a tap 220, and a network monitor 224. Elements of the network 200 are analogous to those described in the context of the network 100. In the following example, however, specific device identifiers are used to illustrate one embodiment for determining a location of the network monitor 224 within a topology of the network 200. As mentioned above, the network 200 is a fiber channel network that is selected only for convenience of explanation. Embodiments of the present disclosure are applicable to other network types.

The servers 204A and 204B are identified by the WWNs of IJK and ABC, respectively. As described above, the WWN of a fiber channel network is typically transmitted when a device is first connected to, or otherwise first logged into, the network 200. Transmissions to and from the servers 204A and 204B more typically include the FCID. In the example shown, the FCIDs of servers 204A and 204B are 0x4A and 0x1A, respectively. Similarly, as data are transmitted to and from the storage devices 212A and 212B, these devices are identified by their FCIDs of 0x3A and 0x2A, and not by their WWNs of KLM and XYZ.

Probe 216, as similarly described above in the context of FIG. 1, using management data, identifies the FCID of the servers 204, the storage devices 212 and/or their respective ports connected to the switch 208. This is shown in address information 218 stored within the probe 216. This identification is accomplished by periodically accessing management data from the switch 208. This information, when collected from all switches 208 in the network 200 and combined, builds the network graph starting with each switch and extending to the devices/ports connected each switch. The combined connection information provides the connections between the different devices throughout the network, and therefore determines the topology of the network. In this example, the address information 218 identified by the probe 216 corresponds to a port having a WWN of ABC that is associated with server 204B. This data is then used to generate a network topology graph in which the devices connected to each switch are identified.

The probe provides address information 218 (whether the FCIDs or their corresponding WWNs) to the network monitor 224. The probe also provides, or makes accessible, the network graph (not shown) described above to the network monitor 224, thus communication the network topology. As described above, the network graph is essentially a map of the logical and/or physical configuration of the network. In embodiments of the present disclosure, the network graph is generated by polling all switches 208 to determine which devices (and/or ports) are connected to each switch, thus building the network graph of device connections. However, because TAP 220 and the network monitor 224 are passive, read-only devices, their identities and locations are not discoverable in this way.

Having received the address information 218 and the corresponding network graph, the network monitor 224 uses the location module 230 to infer its location in the network 200 from the address information 218 and the monitoring data 226. This is accomplished by identifying the devices communicating through switch 208 with which the network monitor 224 is associated via the TAP 220 and then using the network map (derived from the address information 218) to infer the connection location of the network monitor. In this case, using this method, the identified candidate is link 214A and not any of links 214B-D.

In this specific example, the monitoring data 226 identifies communications as originating at a device identified by FCID 0x1A. The monitoring data 226 identifies a single destination device with an FCID of 0x2A. Based on this information alone, the TAP 220 and the network monitor 224 could be connected to either of links 214D or 214A because both carry communications to and from these devices. However, upon receiving additional monitoring data 226 of communications from server 204A (FCID 0x4A) sent to storage 212B (FCID 0x2A), and upon reference to the network graph, the location module 230 infers the connection location of the network monitor 224 as link 214A because this is only link in the network 200 that will carry communications from both servers 204A and 204B to storage 212B. For example, link 214C will not transmit communications from server 204B, and similarly link 214D will not transmit communications from server 204A. This combination of the network graph (or rather, an understanding of the connectivity of devices in the network) and an understanding of which conversations between devices can logically be observed is, in some examples, applied across the entire network to determine the location (or candidate locations if there is insufficient data to precisely determine a single location) of any or all network monitors in the network.

Network Probe

Figure 3:
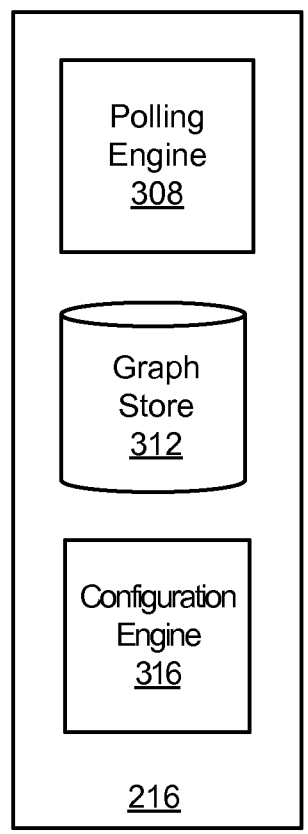
FIG. 3 is an example system for determining a location of a network monitor within a network, in an embodiment.

FIG. 3 is a high level system block diagram of the network probe 216, which, in this example, includes a polling engine 308, a graph store 312, and an optional configuration engine 316.

The polling engine 308 of the probe 216 retrieves address information (whether a WWN or locally unique identifier, such as FCID) from devices connected to the network 200 by periodically polling a switch 108 for the devices/ports connected to the switch. This facilitates maintaining a current roster of the devices connected to each port of the switch 208. When this polling is performed for each switch in a network, a network graph of the network is developed by identifying all of the devices/ports connected to each of the switches.

Figure 4:
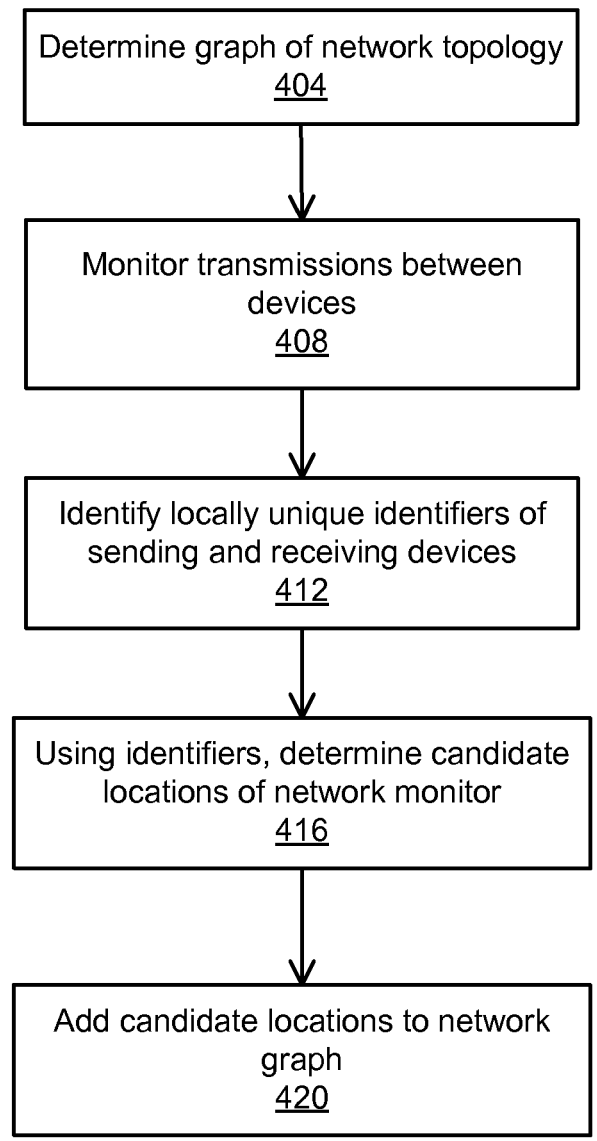
FIG. 4 is a method flow diagram of an example method for determining a location of a network monitor within a network, in an embodiment.

FIG. 4 is a method flow diagram of an example method 400 for determining a location of a network monitor within a network. In this example method, a network graph is determined 404 as described above. Transmissions between devices are monitored 408 and locally unique identifiers of the devices sending and receiving packets are identified 412 by decoding the transmitted packets. The identifiers are used with the network graph to determine 416 candidate locations of the network monitor. The candidate locations are then added 420 to the network graph.

Candidate locations can be determined 416 in various ways, some examples of which are detailed below for illustration. In one example, a set of observations from a link is received as an input to a placement algorithm used to determine 416 candidate locations. The locally unique identifiers (e.g., FCIDs for a fiber channel network) of an initiator (i.e., a device sending a communication, such as server sending data to be stored) and target (i.e., a device receiving the communication, such as a storage device writing data) are identified.

For each initiator and target, all matching switch ports and fabric identifiers are identified from the network graph. Because FCIDs are not globally unique in a graph, it is possible that there are multiple mappings from one FCID (whether of a destination device or a source device) to a switch port (each occurring on one fabric). In one embodiment of the above methods, multiple initiators are identified as located on the same link. In this case, placement of the network monitor is on the initiator side regardless of the number of target FCIDs observed. If a location is not specifically identified, then the placement of the network monitor is associated with one or more candidate locations. The candidate locations can be provided to a user for manual selection of a location.

In another embodiment, if one source device is identified as transmitting to multiple destination devices, then the location of the network monitor will be associated with the link connected to the source device. Similarly, if multiple source devices are identified as transmitting to a single destination device, then the network monitor will be associated with the link connected to the destination device. If the location cannot be specifically placed to a single link, then the candidate locations are identified and optionally provided to a user for selection.

Computing Machine Architecture

Figure 5:
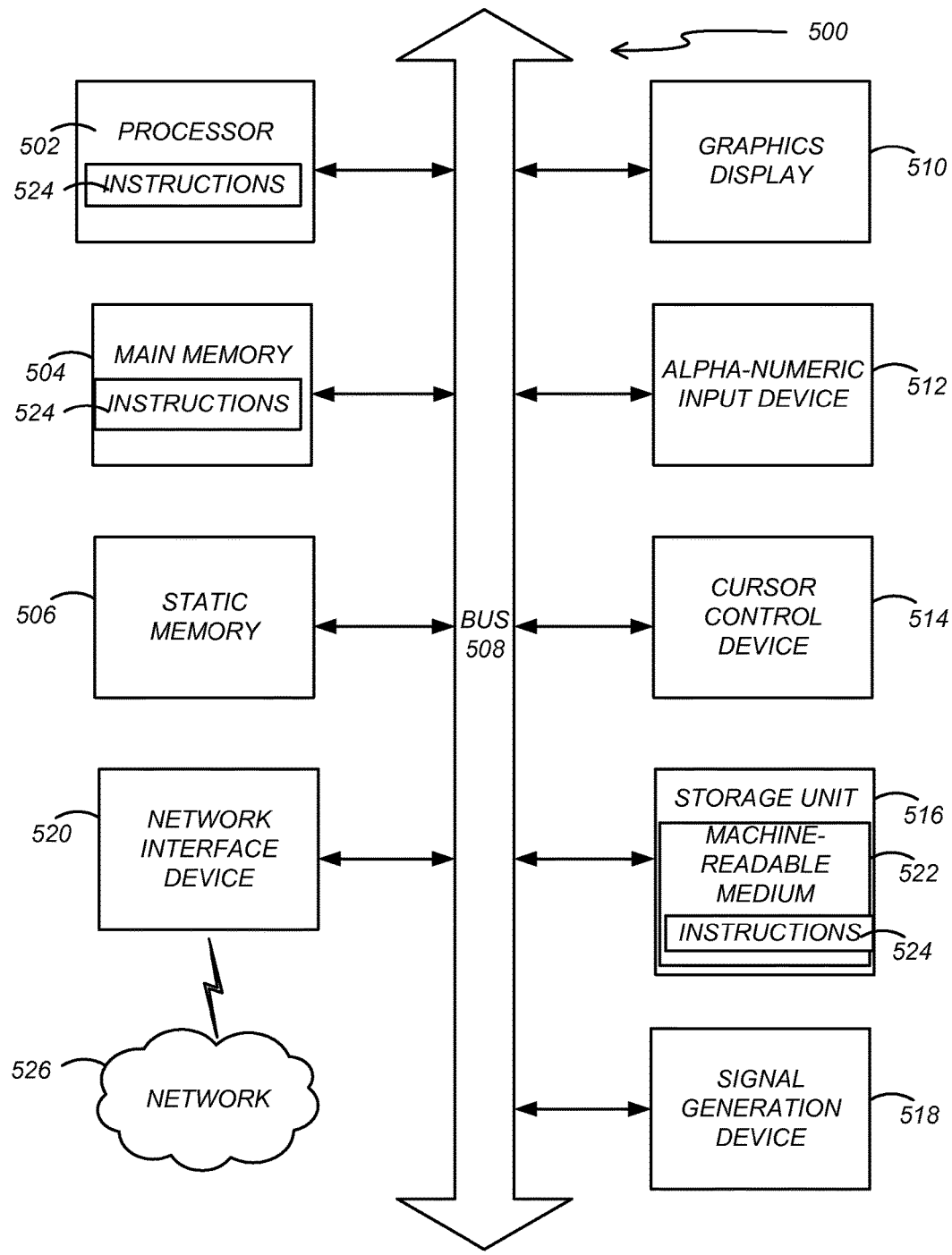
FIG. 5 is a high level diagram of an example computing architecture for use in implementing embodiments described herein.

FIG. 5 is a block diagram illustrating components of an example machine able to read instructions from a machine-readable medium and execute those instructions in a processor to perform the machine processing tasks discussed herein, such as the engine operations discussed above. Specifically, FIG. 5 shows a diagrammatic representation of a machine in the example form of a computer system 500 within which instructions 524 (e.g., software) for causing the machine to perform any one or more of the methodologies discussed herein may be executed. In alternative embodiments, the machine operates as a standalone device or may be connected (e.g., networked) to other machines, for instance via the Internet. In a networked deployment, the machine may operate in the capacity of a server machine or a client machine in a server-client network environment, or as a peer machine in a peer-to-peer (or distributed) network environment.

The machine may be a server computer, a client computer, a personal computer (PC), a tablet PC, a set-top box (STB), a personal digital assistant (PDA), a cellular telephone, a smartphone, a web appliance, a network router, switch or bridge, or any machine capable of executing instructions 524 (sequential or otherwise) that specify actions to be taken by that machine. Further, while only a single machine is illustrated, the term "machine" shall also be taken to include any collection of machines that individually or jointly execute instructions 524 to perform any one or more of the methodologies discussed herein.

The example computer system 500 includes a processor 502 (e.g., a central processing unit (CPU), a graphics processing unit (GPU), a digital signal processor (DSP), one or more application specific integrated circuits (ASICs), one or more radio-frequency integrated circuits (RFICs), or any combination of these), a main memory 504, and a static memory 506, which are configured to communicate with each other via a bus 508. The computer system 500 may further include graphics display unit 510 (e.g., a plasma display panel (PDP), a liquid crystal display (LCD), a projector, or a cathode ray tube (CRT)). The computer system 500 may also include alphanumeric input device 512 (e.g., a keyboard), a cursor control device 514 (e.g., a mouse, a trackball, a joystick, a motion sensor, or other pointing instrument), a data store 516, a signal generation device 518 (e.g., a speaker), an audio input device 526 (e.g., a microphone) and a network interface device 520, which also are configured to communicate via the bus 508.

The data store 516 includes a machine-readable medium 522 on which is stored instructions 524 (e.g., software) embodying any one or more of the methodologies or functions described herein. The instructions 524 (e.g., software) may also reside, completely or at least partially, within the main memory 504 or within the processor 502 (e.g., within a processor's cache memory) during execution thereof by the computer system 500, the main memory 504 and the processor 502 also constituting machine-readable media. The instructions 524 (e.g., software) may be transmitted or received over a network (not shown) via network interface 520.

While machine-readable medium 522 is shown in an example embodiment to be a single medium, the term "machine-readable medium" should be taken to include a single medium or multiple media (e.g., a centralized or distributed database, or associated caches and servers) able to store instructions (e.g., instructions 524). The term "machine-readable medium" shall also be taken to include any medium that is capable of storing instructions (e.g., instructions 524) for execution by the machine and that cause the machine to perform any one or more of the methodologies disclosed herein. The term "machine-readable medium" includes, but should not be limited to, data repositories in the form of solid-state memories, optical media, and magnetic media.

In this description, the term "module" refers to computational logic for providing the specified functionality. A module can be implemented in hardware, firmware, and/or software. Where the modules described herein are implemented as software, the module can be implemented as a standalone program, but can also be implemented through other means, for example as part of a larger program, as a plurality of separate programs, or as one or more statically or dynamically linked libraries. It will be understood that the named modules described herein represent one embodiment, and other embodiments may include other modules. In addition, other embodiments may lack modules described herein and/or distribute the described functionality among the modules in a different manner. Additionally, the functionalities attributed to more than one module can be incorporated into a single module. In an embodiment where the modules as implemented by software, they are stored on a computer readable persistent storage device (e.g., hard disk), loaded into the memory, and executed by one or more processors as described above in connection with FIG. 5.

Alternatively, hardware or software modules may be stored elsewhere within a computing system.

As referenced herein, a computer or computing system includes hardware elements used for the operations described here regardless of specific reference in FIG. 5 to such elements, including for example one or more processors, high speed memory, hard disk storage and backup, network interfaces and protocols, input devices for data entry, and output devices for display, printing, or other presentations of data. Numerous variations from the system architecture specified herein are possible. The components of such systems and their respective functionalities can be combined or redistributed.

Further Considerations

The foregoing description of the embodiments of the disclosure has been presented for the purpose of illustration; it is not intended to be exhaustive or to limit the claims to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based hereon. Accordingly, the disclosure of the embodiments is intended to be illustrative, but not limiting, of the scope of the invention, which is set forth in the following claims.

What is claimed is:

1. A computer implemented method for identifying a location of a network monitor within a network comprising a plurality of devices, the method comprising:
   receiving address information from a plurality of switches in the network, the address information describing which of the plurality of devices are connected to each of the plurality of switches;
   determining, based on the address information, a graph of a network topology comprising the plurality of devices interconnected through the plurality of switches and over a plurality of communication paths, the graph not including the location of the network monitor;
   receiving, using the network monitor, a first transmission between a source device and a destination device, of the plurality of devices, through a first communication path of the plurality of communication paths, wherein the network monitor is coupled to the first communication path;
   based on the first transmission, determining an identifier of the source device and an identifier of the destination device;
   determining, using the identifiers of the source device and the destination device, and the graph of the network topology, at least one candidate location of the network monitor in the network between the source device and the destination device, the at least one candidate location comprising the first communication path; and
   associating the network monitor with the at least one candidate location.

2. The method of claim 1, wherein determining the graph of the network topology comprises:
   identifying a first switch and a second switch of the network, the first switch maintaining a first list of devices connected to the first switch and the second switch maintaining a second list of devices connected to the second switch;
   determining a connection relationship between the first switch and the second switch; and
   combining the first list of devices connected to the first switch and the second list of devices connected to the second switch based on the determined connection relationship between the first switch and the second switch.

3. The method of claim 1, wherein determining the at least one candidate location of the network monitor comprises:
   using the identifier of the source device and the graph of the network topology, identifying at least one communication path between the source device and a switch that could have transmitted the first transmission from the source device;
   using the identifier of the destination device and the graph of the network topology, identifying at least one communication path between the destination device and the switch that could have transmitted the first transmission to the destination device; and
   identifying as the at least one candidate location of the network monitor the at least one communication path in the graph between the source device and the switch and the at least one communication path in the graph between the destination device and the switch.

4. The method of claim 3, further comprising:
receiving, using the network monitor, a second transmission from the source device to a different destination device;
using an identifier of the different destination device and the graph of the network topology, identifying at least one additional communication path between the different destination device and the switch that could have transmitted the second transmission to the different destination device; and
updating the candidate locations to include only communication paths that could have transmitted both the first transmission and the second transmission.

5. The method of claim 1, further comprising:
receiving, using the network monitor, a second transmission between the source device and the destination device through a second communication path of the plurality; and
using the second transmission and the first transmission to identify a location of the network monitor in the network between the source device and the destination device that includes the first communication path and the second communication path.

6. A computer program product stored on a non-transitory computer-readable medium that includes instructions that, when loaded into memory, cause a processor to:
receive address information from a plurality of switches in a network comprising a plurality of devices, the address information describing which of the plurality of devices are connected to each of the plurality of switches;
determine, based on the address information, a graph of a network topology comprising the plurality of devices interconnected through the plurality of switches and over a plurality of communication paths, the graph not including a location of the network monitor;
receive, using the network monitor, a first transmission between a source device and a destination device, of the plurality of devices, through a first communication path of the plurality of communication paths, wherein the network monitor is coupled to the first communication path;
based on the first transmission, determine an identifier of the source device and an identifier of the destination device;
determine, using the identifiers of the source device and the destination device, and the graph of the network topology, at least one candidate location of the network monitor in the network between the source device and the destination device, the at least one candidate location comprising the first communication path; and
associate the network monitor with the at least one candidate location.

7. The computer program product of claim 6, wherein to determine the graph of the network topology, the processor to:
identify a first switch and a second switch of the network, the first switch maintaining a first list of devices connected to the first switch and the second switch maintaining a second list of devices connected to the second switch;
determine a connection relationship between the first switch and the second switch; and
combine the first list of devices connected to the first switch and the second list of devices connected to the second switch based on the determined connection relationship between the first switch and the second switch.

8. The computer program product of claim 6, wherein to determine the at least one candidate location of the network monitor, the processor to:
use the identifier of the source device and the graph of the network topology, identifying at least one communication path between the source device and a switch that could have transmitted the first transmission from the source device;
use the identifier of the destination device and the graph of the network topology, identifying at least one communication path between the destination device and the switch that could have transmitted the first transmission to the destination device; and
identify as the at least one candidate location of the network monitor the at least one communication path in the graph between the source device and the switch and the at least one communication path in the graph between the destination device and the switch.

9. The computer program product of claim 8, wherein the instructions further cause the processor to:
receive, using the network monitor, a second transmission from the source device to a different destination device;
use an identifier of the different destination device and the graph of the network topology, identifying at least one additional communication path between the different destination device and the switch that could have transmitted the second transmission to the different destination device; and
update the candidate locations to include only communication paths that could have transmitted both the first transmission and the second transmission.

10. The computer program product of claim 6, wherein the instructions further cause the processor to:
receive, using the network monitor, a second transmission between the source device and the destination device through a second communication path of the plurality; and
use the second transmission and the first transmission to identify a location of the network monitor in the network between the source device and the destination device that includes the first communication path and the second communication path.

11. A system for identifying a location of a network monitor within a network comprising a plurality of devices, the system comprising:
memory; and
one or more processors to:
receive address information from a plurality of switches in the network, the address information describing which of the plurality of devices are connected to each of the plurality of switches;
determine, based on the address information, a graph of a network topology comprising the plurality of devices interconnected through the plurality of switches and over a plurality of communication paths, the graph not including the location of the network monitor;
receive, using the network monitor, a first transmission between a source device and a destination device, of the plurality of devices, through a first communication path of the plurality of communication paths, wherein the network monitor is coupled to the first communication path;

based on the first transmission, determine an identifier of the source device and an identifier of the destination device;

determine, using the identifiers of the source device and the destination device, and the graph of the network topology, at least one candidate location of the network monitor in the network between the source device and the destination device, the at least one candidate location comprising the first communication path; and associate the network monitor with the at least one candidate location.

12. The system of claim 11, wherein to determine the graph of the network topology, the one or more processors to:

identify a first switch and a second switch of the network, the first switch maintaining a first list of devices connected to the first switch and the second switch maintaining a second list of devices connected to the second switch;

determine a connection relationship between the first switch and the second switch; and combine the first list of devices connected to the first switch and the second list of devices connected to the second switch based on the determined connection relationship between the first switch and the second switch.

13. The system of claim 11, wherein to determine the at least one candidate location of the network monitor, the one or more processors to:

use the identifier of the source device and the graph of the network topology, identifying at least one communication path between the source device and a switch that could have transmitted the first transmission from the source device;

use the identifier of the destination device and the graph of the network topology, identifying at least one communication path between the destination device and the switch that could have transmitted the first transmission to the destination device; and identifying as the at least one candidate location of the network monitor the at least one communication path in the graph between the source device and the switch and the at least one communication path in the graph between the destination device and the switch.

14. The system of claim 11, the one or more processors further to:

receive, using the network monitor, a second transmission from the source device to a different destination device;

use an identifier of the different destination device and the graph of the network topology, identifying at least one additional communication path between the different destination device and the switch that could have transmitted the second transmission to the different destination device; and update the candidate locations to include only communication paths that could have transmitted both the first transmission and the second transmission.

15. The system of claim 11, the one or more processors further to:

receive, using the network monitor, a second transmission between the source device and the destination device through a second communication path of the plurality; and use the second transmission and the first transmission to identify a location of the network monitor in the network between the source device and the destination device that includes the first communication path and the second communication path.

* * * * *